US006737760B2

(12) United States Patent
Jenni

(10) Patent No.: US 6,737,760 B2
(45) Date of Patent: May 18, 2004

(54) METHOD FOR NEGATIVE FEEDBACK CONTROLLING ELECTRICAL POWER AND NEGATIVE FEEDBACK CONTROLLED POWER SUPPLY

(75) Inventor: Felix Jenni, Brugg (CH)

(73) Assignee: Paul Scherrer Institut, Villigen (CH)

( * ) Notice: Subject to any disclaimer, the term of this patent is extended or adjusted under 35 U.S.C. 154(b) by 432 days.

(21) Appl. No.: 09/880,826

(22) Filed: Jun. 15, 2001

(65) Prior Publication Data

US 2002/0190577 A1 Dec. 19, 2002

(51) Int. Cl.[7] .................................................. G05F 1/56
(52) U.S. Cl. .......................................... 307/31; 323/283
(58) Field of Search ......................... 363/21.12; 307/31; 323/283

(56) References Cited

U.S. PATENT DOCUMENTS 5,272,614 A    12/1993   Brunk et al.

FOREIGN PATENT DOCUMENTS

DE    19600884    7/1997
WO    98/44622    10/1998

OTHER PUBLICATIONS

International Search Report Application No. PCT/CH/01/00376; International Filing Date, Jun. 15, 2001, Applicant: Paul Scherrer Institut. et al. pp. 1–6.

Primary Examiner—Gregory J. Toatley, Jr.
(74) Attorney, Agent, or Firm—Jacob Eisenberg; Paul Scherrer Institut

(57) ABSTRACT

Negative feedback control of a power supply is improved with respect to accuracy of control in that the controlled value is monitored by parallel analog to digital conversion. Additionally, within the negative feedback control loop adjustment of the controlled value to follow a rated value is performed by pulse-width modulation. So as not to be bound with respect to accuracy of adjustment by pulse-width modulation to a minimum pulse-width adjustment increment, fine adjustment is additionally done by superimposing to the pulse-width modulation a pulse-frequency modulated signal.

33 Claims, 6 Drawing Sheets

METHOD FOR NEGATIVE FEEDBACK CONTROLLING ELECTRICAL POWER AND NEGATIVE FEEDBACK CONTROLLED POWER SUPPLY

BACKGROUND OF THE INVENTION

The present invention is directed to a method for negative feedback controlling electrical power delivered to an electrical load, which method comprises generically, and as known to the skilled artisan, monitoring the electrical power delivered to the load, thereby generating a monitoring signal, forming in dependency of the monitoring signal and of a rated value signal a control deviation signal and adjusting—via a controller as e.g. a proportional or proportional-integral controller—the electrical power delivered and monitored in function of the control deviation signal.

The present invention thereby departs especially from such method and power supply for delivering high power of at least 100 VA to a load.

SUMMARY OF THE INVENTION

It is an object of the present invention to provide such a negative feedback control method and, accordingly, such a negative feedback controlled power supply for superior accuracy of controlled power delivered to the load, with respect to a rated power value to be delivered.

Under a first aspect, the present invention departs from a method for negative feedback controlling electrical power delivered to an electrical load as mentioned above, whereat monitoring the electrical power delivered to the load results first in an analog monitoring signal, which is then analog to digital converted so as to result in a digital monitoring signal.

Under a second aspect, the present invention departs from a method for negative feedback controlling electrical power delivered to an electrical load as mentioned above, whereat adjusting the electrical power delivered to the load and monitoring is performed as a function of the control deviation signal—again via a respective controller—by means of Pulse-Width Modulation (PWM).

In a method for negative feedback controlling electrical power, whereat the controlled value, namely the power delivered to the load, is digitalized as under the first aspect of the present invention, the overall accuracy of the negative feedback control significantly depends on the accuracy of the analog to digital conversion of the monitored signal. As is well known in the art of analog to digital conversion, noise of the analog input signal leads to digital output signal jitters by at least one least significant bit (LSB). This problem is customarily resolved by oversampling, i.e. by establishing a sampling rate which is considerably higher than necessitated by the spectrum of the analog signal to be converted. In fact, by oversampling, a multitude of digital samples are generated in a predetermined time frame, and the respective digitalized output value is formed by averaging the digital samples. Nevertheless, oversampling is always limited by the layout of a specifically considered converter not suited to handle sampling rates above a specific maximum rate. Rising the sampling rate over such limit makes it necessary to apply a differently designed A/D-converter which is often much more expensive and more critical to operate.

Under the generic object of the present invention as outlined above, and under the first aspect, it is therefore an object of the present invention to provide for an increased conversion accuracy of A/D-conversion of the monitoring signal, thereby avoiding the above mentioned drawbacks.

This object is inventively resolved by the method mentioned above and according to the preamble of claim 1, at which the analog monitoring signal is analog to digitally converted by performing the analog to digital conversion at least twice in parallel.

Thereby, at least two analog to digital converters, each construed for a predetermined sampling rate, are operated in parallel. This leads to an overall conversion with at least double that sampling rate, wherefore each of the converters is construed for, if both converters—as preferred—are operated at equal sampling rates.

Under the second aspect of the present invention the following has to be considered: Whenever a method for negative feedback controlling electrical power delivered to an electrical load comprises adjusting the electrical power delivered to the load and monitored by means of PWM, accuracy of adjustment is significantly limited by the predetermined minimum pulse-width adjustment increment by which pulse length may be at all adjusted.

It is therefore a further object of the present invention, at a method as mentioned above, whereat, within the negative feedback loop, adjusting of the electrical power delivered to the load and monitored in function of the control deviation signal is performed by pulse-width modulation with a predetermined pulse repetition period, to improve adjustment accuracy beyond the limit set by the predetermined minimum pulse-width adjustment increment.

This object is resolved inventively and according to the characterizing part of claim 2 by calculating from the control deviation signal a desired pulse-width adjustment increment. Such a desired pulse-width adjustment increment will normally not accord with an integer multiple of the predetermined minimum pulse-width adjustment increment of the PWM considered. Therefore, and according to this second aspect of the present invention, a pulse of predetermined, preferably fixed length is not applied in every pulse repetition period, but only so often in time that, averaged over time, the adjustment by the integer multiple on one hand and/or the pulse accords with a pulse-width modulation adjustment with said desired pulse-width adjustment increment.

Thereby, one can exactly deal with any desired adjustment according to any fractions of the predetermined minimum pulse-width adjustment increment.

If e.g. the minimum predetermined pulse-width adjustment increment is of 30 nsec. and an actual control deviation would necessitate a pulse-width adjustment by an increment only of 10 nsec., then the calculation will reveal in preferred mode that the pulse of predetermined length (as in a most preferred embodiment a pulse which is the predetermined minimum pulse-width adjustment increment of 30 nsec.) is to be applied in every third pulse repetition period. This leads, time-averaged as by filtering, to the same result as applying a 10 nsec. pulse in every period of PWM.

If e.g. the control deviation signal reveals a desired pulse-width adjustment increment of 40 nsec., then there will be applied in each pulse repetition of the PWM one predetermined minimum pulse-width adjustment increment and, additionally, in every third period an additional predetermined minimum pulse-width adjustment increment, if, as in the most preferred mode, the pulse is selected to be just this increment.

In other words, this inventive technique combines customary pulse-width adjustment technique of PWM with a pulse frequency modulation (PFM) technique, at which pulses of a predetermined fixed length, namely as preferred according to the predetermined minimum pulse-width, are applied at a varying frequency.

According to the wording of claim 3, in a preferred embodiment of the inventive method and power supply both aspects of the invention as outlined above, namely of inventive A/D-conversion and of inventive adjustment by PWM and superimposed PFM, are combined.

Although the present invention under all its aspects may be used or realized for lower power supply, in a far preferred mode of operation, it is realized for controlling the electrical power of at least 100 VA delivered to a load. Monitoring the electrical power delivered to the load may be performed by monitoring the current or voltage delivered to the load.

In spite of the fact that the above mentioned A/D-conversion, at least twice in parallel, might be applied in cases, where both conversions are performed at minimum required sampling rates, additionally to the inventively performed parallel conversion, each of the A/D-conversions is performed with oversampling.

In spite of the fact that A/D-conversion in parallel could be performed in some cases at mutually different sampling rates, e.g. at sampling rates of integer ratio, A/D-conversions are performed in parallel at respective equal sampling rate.

Such an equal sampling rate may vary in time, in some applications, e.g. where the bandwidth development of an analog signal to be monitored is known in advance.

Nevertheless, in a preferred embodiment, parallel A/D-conversions are performed at respective equal and constant sampling rates. In a further preferred mode the converters are operated synchronously.

In a further preferred embodiment, each of the at least two parallel A/D-conversions is performed with a sampling rate of at least 100 kHz, thereby resulting in an overall sampling rate of two parallel conversions of 200 kHz.

Turning back to the present invention under its second aspect or under preferred combination of both of its aspects, in a preferred embodiment the pulse of predetermined length—applied by PFM—is selected to be the incremental pulse of the predetermined minimum pulse-width adjustment increment. Although this pulse needs not necessarily be of constant length, this is clearly the preferred mode.

Either the instantaneous control deviation may be corrected by an adjustment of the PWM pulse-width by an integer multiple of predetermined minimum pulse-width adjustment increments, or the instantaneous control deviation may only be accurately corrected by adjusting pulse-width modulation as was just explained and by additionally providing for applying pulses, preferably of the predetermined minimum pulse-width adjustment increments, by pulse frequency modulation, i.e. with a variable repetition rate, namely so often in time as necessary to deal with a control deviation which necessitate applying a PWM-adjusnnent by a fraction of the predetermined minimum pulse-width adjustment increment. Nevertheless, the case may also occur, where no pulse-width modulation adjustment at all is necessary, in these cases, namely for down to zero adjustments only, the single pulses, preferably of an extent according to the predetermined minimum pulse-width adjustment increment, are applied with the (modulatable) repetition rate set as necessary.

Thereby and in a further preferred mode, at the pulse frequency modulation, the accordingly modulated pulse repetition period is modulated by an integer multiple of the pulse repetition period of the pulse-width modulation.

For resolving the above mentioned object under the first aspect of the present invention there is further proposed a negative feedback control power supply. Under its second aspect a negative feedback control power supply resolves the above mentioned object, and in a preferred mode the objects under both of the aspects of the present invention are resolved by the digital negative feedback control power supply, which combines both aspects of the present invention.

Preferred embodiments of the inventive negative feedback control power supply under both its aspects will additionally become apparent from the following detailed description. Further, the inventive power supply, especially combining both aspects, is applied to magnet-supply of a synchrotron, thereby resulting in an inventive synchrotron system.

BRIEF DESCRIPTION OF THE SEVERAL VIEWS OF THE DRAWINGS

In the detailed description, preferred embodiments of the present invention will be described as examples and referring to figures. These figures show.

DETAILED DESCRIPTION THE INVENTION

Figure 1:
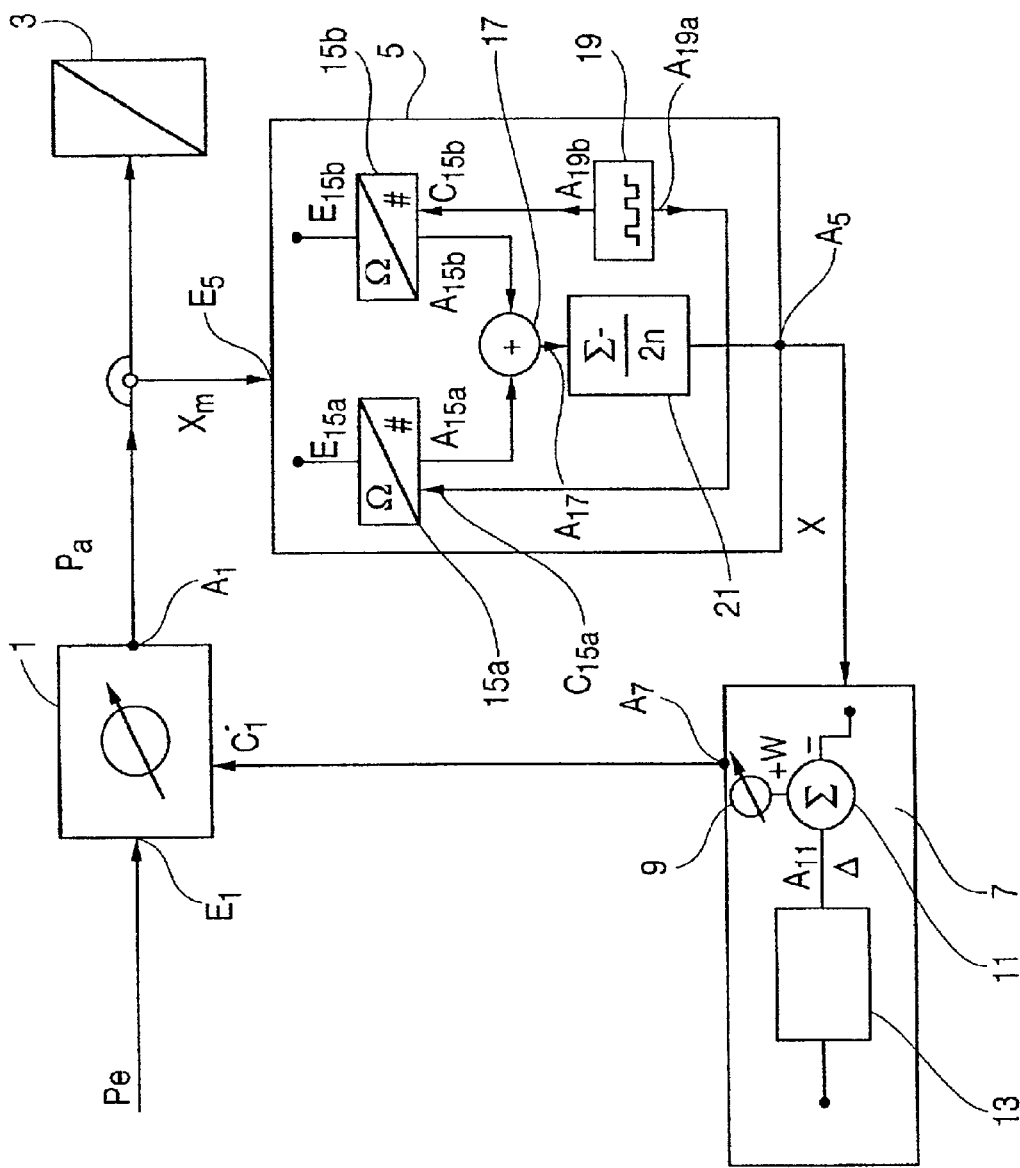
FIG. 1 By means of a simplified functional block/signal flow diagram an inventive negative feedback controlled power supply under the first aspect and operating according to the inventive method under its first aspect.

In FIG. 1 there is shown, by means of a simplified functional block/signal-flow diagram a preferred embodiment of the negative feedback controlled power supply according to the present invention and operating according to a preferred variant of the inventive method, both under the first aspect of the present invention.

According to FIG. 1 uncontrolled electrical power line $P_e$ is fed to a power input $E_1$ of a power adjusting unit 1. From a power output $A_1$ of unit 1 the adjusted or controlled power line $P_a$ is led to an electrical load 3. A monitoring input $E_5$ of a monitoring unit 5 is operationally connected to power line $P_a$, thereby monitoring load current and/or load voltage. Generically the adjusted power on line $P_a$ at the output $A_1$ of adjusting unit 1 is monitored by monitoring unit 5 as the measured controlled value $X_m$ of the negative feedback control loop to be further described.

The output signal X and respectively the output $A_5$ of monitoring unit 5 are operationally connected to a difference-forming unit 7, whereat the signal from $A_5$ is subtracted from a rated value signal W, which is selected at a rated value generating source 9. In spite of the fact that this rated value source 9 is shown in FIG. 1 incorporated within controller unit 7, a rated value signal W may clearly be fed to that control unit 7 from an external signal source.

At the output $A_{11}$ of difference forming unit 11, whereat, from the said rated value signal W and from the controlled value signal X a control deviation signal Δ is formed, which is fed to a controller 13, the output thereof being operationally connected to a control output $A_7$ of controller unit 7. Output $A_7$ is operationally connected to control input $C_1$ of adjusting unit 1.

According to the embodiment of FIG. 1 and thereby according to the present invention under its first aspect, the input E.sub.5 of the monitoring unit 5, with the analog monitoring signal $X_m$, is operationally connected to the analog inputs E.sub.15a and E.sub.15b of at least two analog to digital converters (ADC) 15a and 15b of monitoring unit 5. The digital signal outputs A.sub.15a and A.sub.15b of the ADCs 15a, 15b are operationally connected to superimposing unit 17.

The monitoring unit 5 further comprises a sampling/converting control unit 19 generating at two outputs $A_{19a}$, $A_{19b}$ respective pulse trains which are fed to sample/conversion control inputs $C_{15a}$ and $C_{15b}$ at the respective ADCs 15a and 15b.

Figure 2:
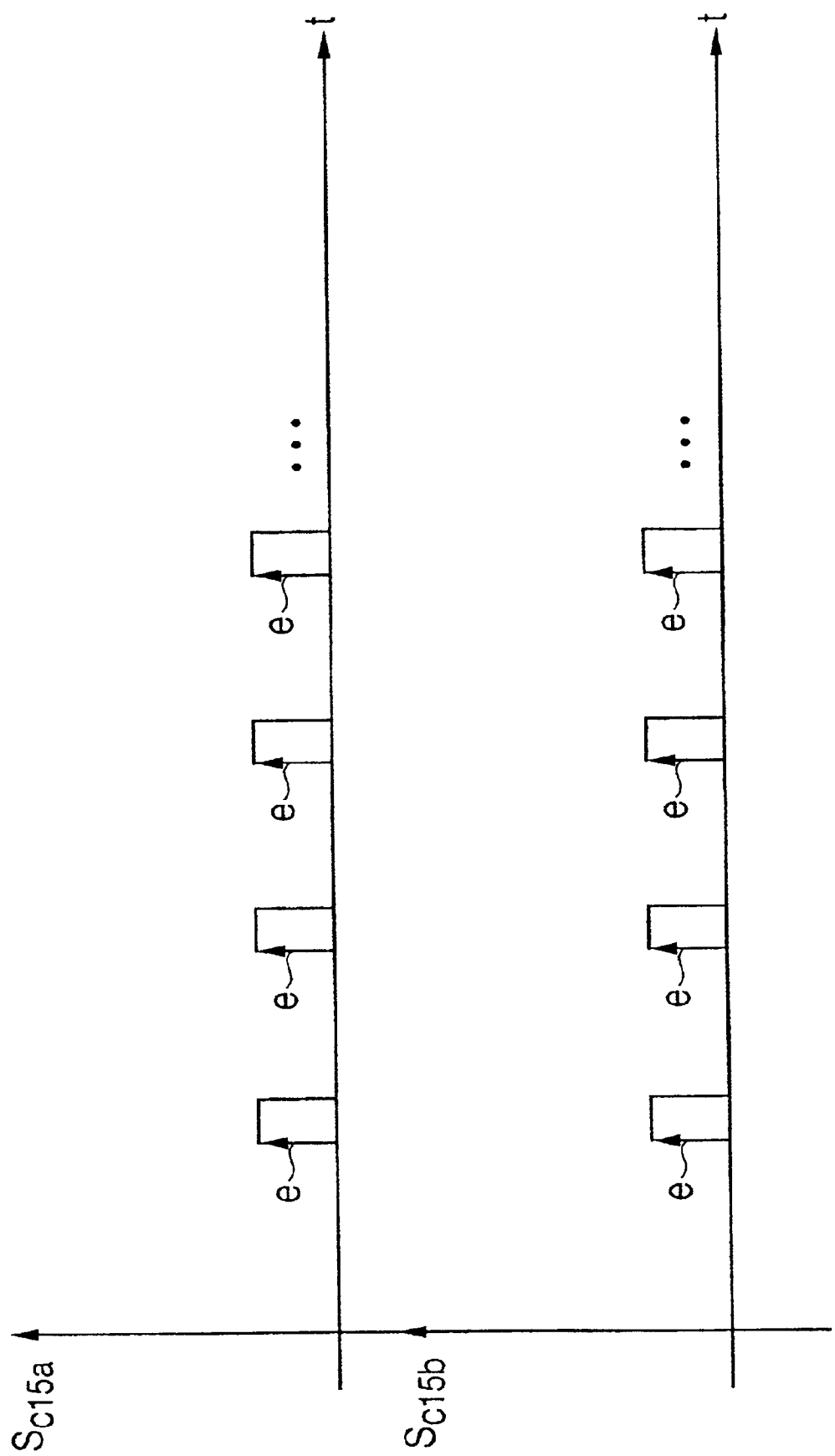
FIG. 2 qualitatively, control input trains applied to a parallel operated analog to digital converter as provided in the embodiment of FIG. 1.

As shown in FIG. 2 the sampling/converting control signals $S_{C15a}$ and $S_{C15b}$, and especially their edges as of e are preferably in synchronism, so that the two ADCs 15a and 15b, which are operated in parallel, perform sampling simultaneously.

Nevertheless, it is also possible to operate the converters
staggered in time and/or
at time varying sampling rates and/or
at different sampling rates
in some cases.

Thereby, the sampling rates at the at least two ADCs are most preferably selected to perform oversampling.

At the output of superimposing unit $A_{17}$ the conversion results of the at least two ADCs 15a, 15b appear as respective digital words.

The output $A_{17}$ and thus the conversion result signals are fed to an averaging unit 21, which performs digital averaging of the digital signals provided from $A_{17}$. If sampling and especially oversampling each of the converters 15 provides for n digital values, due to the fact that parallel conversion is performed, 2·n or more generically k·n digital values are averaged.

Thus, the overall sampling rate is increased by the number k of parallely processed conversions, without the need of resolving at a single ADC the problems for raising the oversampling rate.

Figure 3:
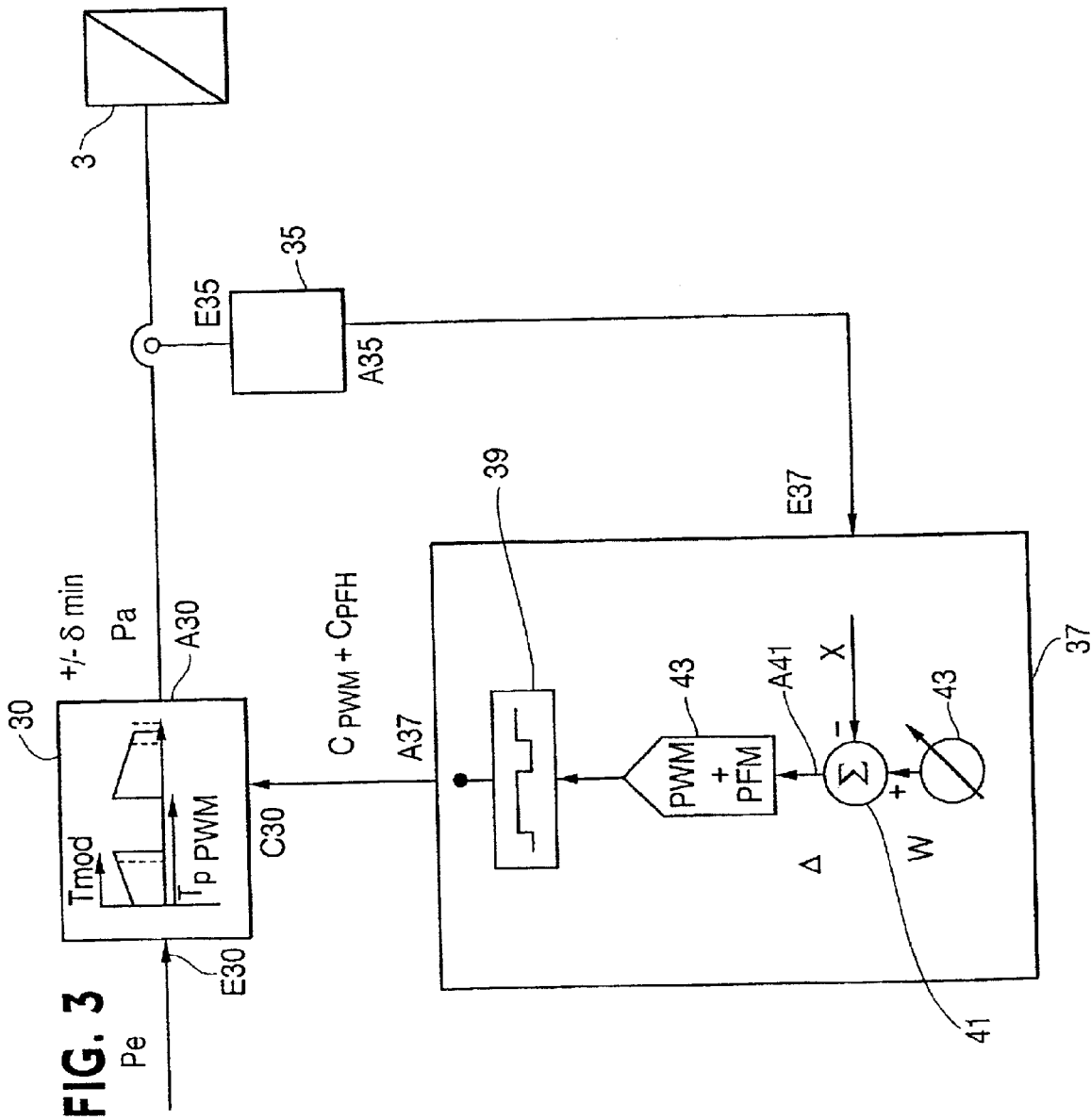
FIG. 3 in a simplified functional block/signal flow representation according to the representation of FIG. 1, a further preferred embodiment of the present invention under its second aspect, namely of a further embodiment of an inventive power supply operating according to an inventive method.

Again in a simplified functional block/signal flow diagram, FIG. 3 shows a negative feedback controlled power supply according to the present invention under a second aspect and operating accordingly to the second aspect of the method according to the present invention.

Electric power line $P_e$ is fed to the power input $E_{30}$ for uncontrolled power of a power adjusting unit 30. The output $A_{30}$ thereof for controlled power is operationally connected to a power monitoring unit 35 and to an electrical load 3. Power monitoring unit 35 monitors load current and/or load voltage. Monitoring unit 35 needs not be construed as was explained in context with FIG. 1. In most generic terms, monitoring unit 35 does not even provide for analog to digital conversion.

The output $A_{35}$ of the monitoring unit 35 is operationally connected to input $E_{37}$ of the controller unit 37. A control output $A_{37}$ of unit 37 is operationally connected to control input $C_{30}$ of adjusting unit 30.

The adjusting unit 30 is construed as a power pulse-width modulation unit. A control signal applied to control input C.sub.30 controls pulse-width within the pulse repetition period T.sub.p of the pulse-width modulation PWM. Additionally, every pulse applied to C.sub.30 leads to transmission of power from E.sub.30 to A.sub.30 during the time extent of such pulse. Pulse-width modulation of power delivered to load 3 from power adjusting unit 30 may be said to be controlled by a control signal C.sub.PWM defining for a controlling pulse-width modulated signal, which is generated within controller unit 37 by a pulse-width control unit 39. In block 39 the control signal C.sub.PWM is shown as a pulse-width modulated analog signal; also it will be represented in a preferred mode by a digital control signal.

Due to the specific layout of PWM power adjusting unit 30 and/or possibly pulse-width controlling unit 39, pulse-width $T_{mod}$ of the pulse-width modulated power signal may only be changed by an integer number m of predetermined minimum pulse-width adjustment increment $\delta_{min}$. This predetermined pulse-width minimum adjustment increment $\delta_{min}$ limits adjusting accuracy of the power output to the electric load 3 and monitored by monitoring unit 35.

Still according to the invention under this second aspect, the output signal of monitoring unit 35 is operationally connected via input E.sub.37 of controller unit 37 to a difference forming unit 41, as controlled signal X. At difference forming unit 41, from the controlled value X and a rated value $W_a$ generated by a rated value source 43, a control deviation signal .DELTA. is generated. The control deviation .DELTA. is fed via a controller (not shown here) to a calculating unit 43.

Figure 4:
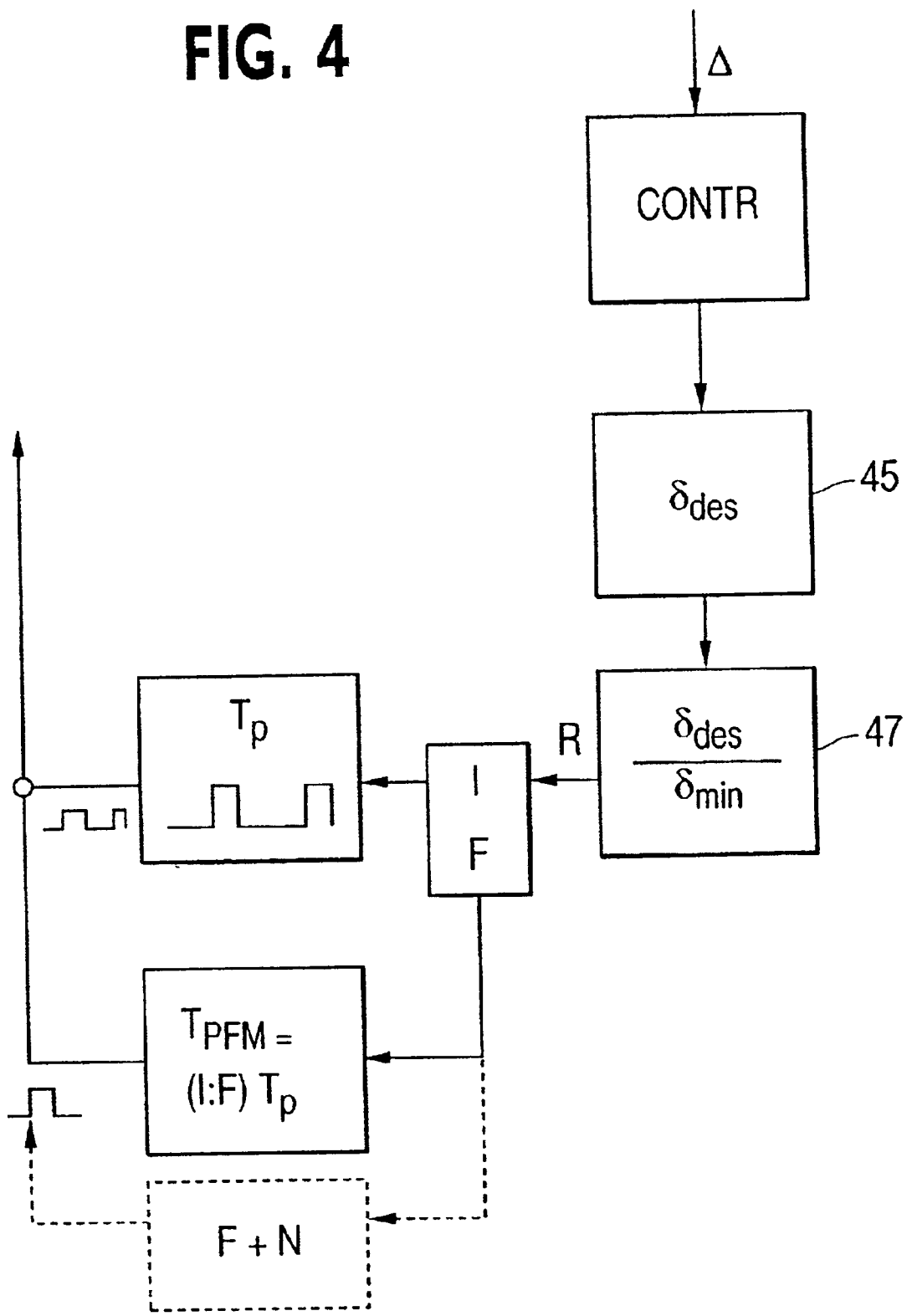
FIG. 4 in a simplified functional block/signal flow diagram, a possible structure of a calculation unit as incorporated in a controller unit as of the embodiment of FIG. 3.

FIG. 4 shows in more details, what operations are principally performed inventively at calculation unit 43. In a function of the actual control deviation signal .DELTA., calculation unit 43 determines, as schematically shown in FIG. 4, in block 45, a desired adjustment .delta..sub.des which would have to be applied to the control input C.sub.30 of power adjusting unit 30, to negative feedback control the power P.sub.a delivered to the electric load 3 exactly to match the desired value W so that .DELTA. becomes at least approximately zero. Nevertheless, and as was explained, power adjusting unit 30 and/or pulse-width modulation control unit 39 are limited with respect to the minimum predetermined adjustment increment .delta..sub.min with which pulse-width T.sub.mod may be changed. Therefore, the present invention under this aspect considers that although no pulse-width adjustment increments may be applied which are smaller than .delta..sub.min, frequency with which a pulse-width adjustment is applied is an additional parameter which allows controlling the effect on the power output at A.sub.30.

As will be explained, the drawback that pulse-width modulation provides for a predetermined minimum pulse-width adjustment increment .delta..sub,min is bypassed by introducing additionally to pulse-width modulation PWM, pulse frequency modulation PFM. In pulse-frequency modulation PFM, pulses of predetermined fixed length are applied and the repetition rate of these pulses are varied.

As schematically shown in FIG. 4 by block 47, calculating unit 43 determines as a possible form of realization the ratio R of the desired adjustment increment .delta..sub.min and the predetermined minimal adjustment increment by way of assumption this ratio results in a number R=2.6.

Unless the desired adjustment .delta.sub.des accords exactly with an integer multiple of the predetermined minimum pulse-width adjustment increment .delta.sub.min, R may be written as R=I.multidot.10.sup.0+F.mu−Itidot.10.sup.−1 as of 2.6 with I=2.multidot.10.sup. 0 and F=6.multidot.10.sup.−1. Thus, the result of ratio forming in unit 47 is split in an integer I and a fraction F. The integer number I directly controls adjustment of pulse-width T.sub.mod of the pulse-width modulation by the according number of increments I.multidot.delta..sub.m− in in each pulse repetition period T.sub.p. This accords to customary pulse-width modulation control.

The fractional number F, in the above example of 0.6, is used to apply additionally to the pulse-width modulation a pulse train, which is pulse frequency modulated PFM and with a preferably fixed pulse, preferably of time extent .delta.sub.min. Thus, such additional pulse is no longer applied in succeeding pulse repetition periods T.sub.p, but just as often as necessary to have, averaged over time, the same effect on the power at A.sub.30 as if in every pulse repetition period T.sub.p the pulse length would be changed by F.multidot..delta..sub.min, which is not feasible. If we take T.sub.p as a time unit, the time period with which an impulse of extent .delta..sub.min is to be applied becomes T.sub.PFM=1,F, thus for our example T.sub.PFM=1,67. Thus, instead of applying a respective adjustment of pulse-width in every time frame according to every pulse repetition period T.sub.p, the repetition period prevailing for applying a single additional pulse of extent .delta.sub.min is modulated to (1:F).mulddot.T.sub.p.

Figure 5:
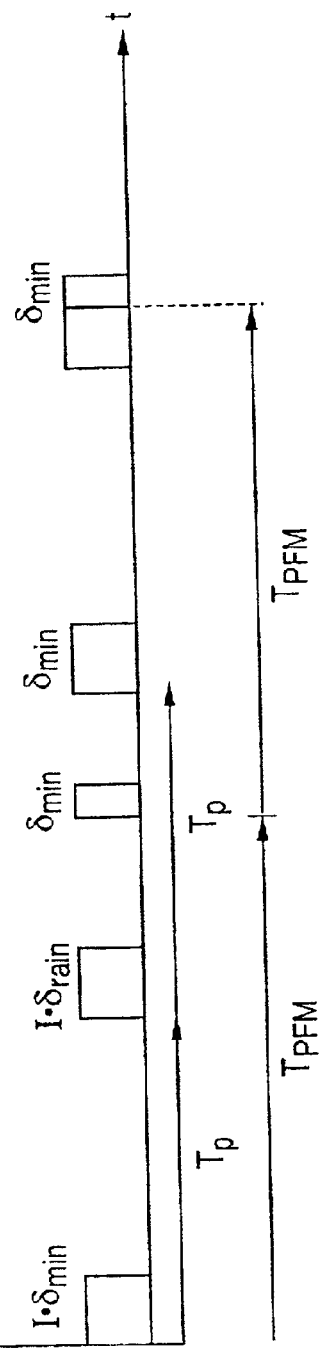
FIG. 5 a time diagram of superimposed pulse-width modulation and pulse-frequency modulation as realized by the embodiment according to the FIGS. 3 and 4.

In FIG. 5 this superposition of pulse-width modulation adjusting and of pulse frequency modulation adjusting is exemplified. In every pulse repetition period $T_p$ pulse width adjustment is performed with an adjustment according to $I \cdot \delta_{min}$ according to the above example by $2 \cdot \delta_{min}$.

Additionally, there is superimposed the pulse frequency modulated signal consisting of fixed-extent pulses as of $\delta_{min}$ applied with a rate according to a repetition period of $T_{PFM}=(1:F)T_p$. Thus, in FIG. 3 the control signal to $C_{30}$ becomes $C_{PWM}+C_{PFM}$.

Although this procedure is absolutely possible, it is not optimum in view of the fact that pulse-width modulation is clocked at a predetermined fixed rate according to $T_p$ and that procedure according to FIG. 5 may lead to pulse-width modulated signals overlapping with the frequency-modulated impulse train. This situation would necessitate additional efforts to compensate for such occurrences.

Therefore, In a preferred embodiment, the frequency-modulated signals with pulses of the extent .delta..sub.min are applied during F.multidot.N of succeeding pulse repetition periods T.sub.p wherein N stands for a number of succeeding pulse-repetition periods of pulse-width modulation. According to the above mentioned example and taking N e.g. to be 10, the single pulse of .delta..sub.min is applied to 6 pulse repetition periods T-sub.p out of 10.

Accordingly, frequency modulation is performed in discrete steps of pulse repetition period T.sub.PFM which step being T.sub.p. This preferred realization form is shown in FIG. 4 by dashed lines.

Figure 6:
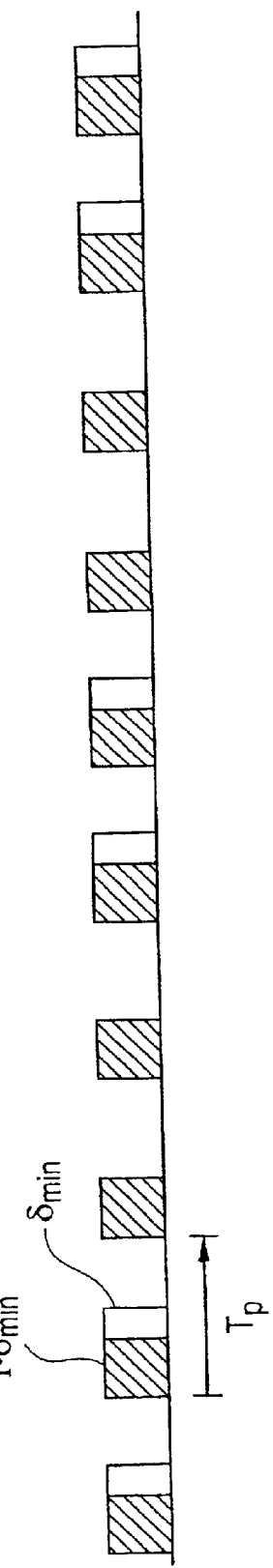
FIG. 6 a preferred form of superimposed pulse-width modulation and pulse frequency modulation as preferably realized in the embodiment according to FIGS. 3 and 4, and FIG. 7 an embodiment in accordance with FIG. 4.

This latter approach is further exemplified in FIG. 6, where according to the above example out of 10 pulse repetition periods $T_p$ of the pulse-width modulation, in 6 an additional pulse of $\delta_{min}$ is applied. Averaged over time the output power $P_a$ of power adjusting unit 30 is adjusted accurately according to the desired pulse-width adjustment increment $\delta_{des}$ which accords to the instantaneous control deviation $\Delta$.

Figure 7:
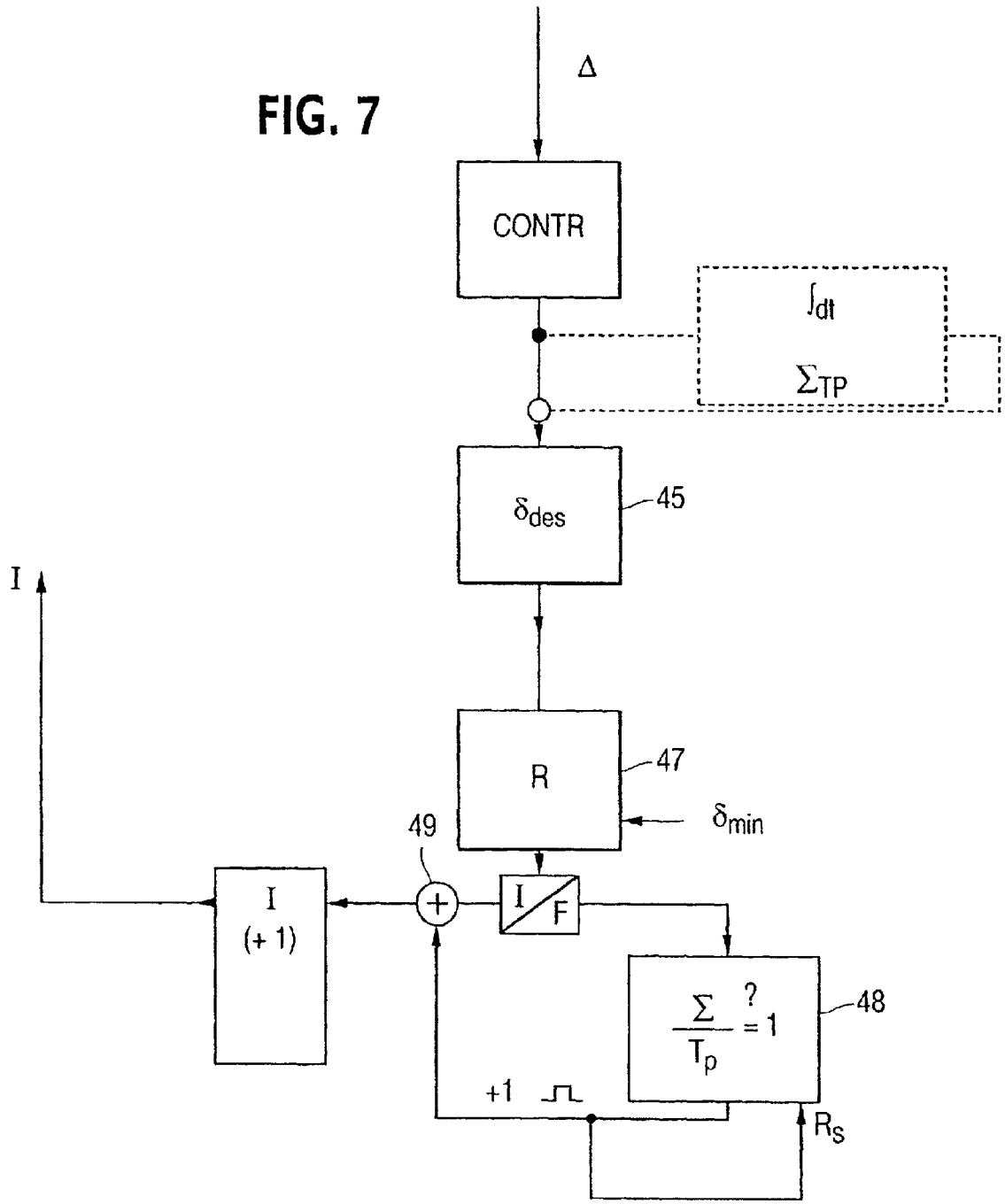

In FIG. 7 a most preferred form of PMW and PFM realization is shown as incorporated preferably in calculation unit 43. The instantaneous control deviation $\Delta$ is fed via the controller again to a unit 45, where, according to the instantaneous control deviation $\Delta$, a desired pulse-width adjustment increment $\delta_{des}$ is calculated.

From this desired pulse-width adjustment increment $\delta_{des}$, as was explained in context with FIG. 4, unit 47 determines the ratio R of $\delta_{des}$ and the predetermined minimum pulse-width adjustment increment $\delta_{min}$. From the resulting ratio R ($\delta_{des}/\delta_{min}$) the integer part I is stored and controls the adjustment of pulse-width of the pulse-width modulation by $I \cdot \delta_{des}$. Thereby, the control deviation $\Delta$ drops so that R becomes smaller than unity according to the fraction F of the previously calculated value. The fraction F of the ratio R at the output of unit 47 is integrated or summed over time in a summing unit 48, preferably for each subsequent period $T_p$. The output of summing unit 48 is added as schematically shown in FIG. 7 by adding unit 49 to the integer output of unit 47. Thus, as soon as time integral or the sum of the remaining fraction F of ratio R at the output of unit 48 reaches unity, the value I is incremented by one, and, in a single pulse repetition period $T_p$ of pulse-width modulation, the prevailing pulse is additionally adjusted by the one predetermined minimum pulse-width adjustment increment $\delta_{min}$.

By this adjustment in that period T.sub.p considered, the prevailing value of the control deviation and of the ratio R again drops. By resetting unit 48 as schematically shown at R.sub.s in FIG. 7 as soon as its output signal reaches unity, in the subsequent periods T.sub.p pulse-width, is kept adjusted by I.multidot.delta..sub.min.

As shown in dashed line in FIG. 7, instead of checking whether the sum of the subsequent values F of the ratio R reaches a value for incrementing I by unity, it is absolutely possible to integrate or sum, preferably after the controller, the control deviation $\Delta$.

In a preferred embodiment of the inventive power supply and of the inventive method, both aspects according to FIG. 1 and directed to accurate analog to digital conversion of the monitored power and according to the FIGS. 3 to 6 with respect to inventively adjusting the power fed to the electric load 3 in a negative feedback power control loop are combined to result in digital negative feedback control of the power supplied to a load 3.

By realizing such combined technique with two 16 bit analog to digital converters 15 according to FIG. 1, each operated at a sampling rate of 100 kHz, and by realizing pulse-width modulation with superimposed pulse frequency modulation as was described especially with the help of FIGS. 4 and 6, there was achieved an accuracy of resolution of at least 10 ppm and even down to a resolution accuracy of 1 ppm. This for a power supply for at least 100 VA power used for power supplying the magnet arrangement of synchrotron magnets.

I claim:

1. A method for negative feedback controlling electrical power delivered to an electrical load comprising:

monitoring electrical power delivered to said load, thereby generating an analogue monitoring signal;

analog to digital converting said analog monitoring signal to generate a digital monitoring signal;

forming in dependency of said digital monitoring signal and of a preselected rated value signal a control deviation signal; and adjusting said electrical power delivered and monitored in function of said control deviation signal, characterized by performing said analog to digital converting at least twice in parallel.

2. A method for negative feedback controlling electrical power delivered to an electrical load comprising:

monitoring electrical power delivered to said load, thereby generating a monitoring signal;

forming in dependency of said monitoring signal and of a rated value signal a control deviation signal;

adjusting said electrical power delivered and monitored in function of said control deviation signal by means of pulse-width modulation with a predetermined pulse repetition period;

said pulse-width modulation being adjustable with a predetermined minimum pulse-width adjustment increment; and wherein by calculating from said control deviation signal a desired pulse-width adjustment increment and applying an integer multiple of said predetermined minimum pulse-width adjustment increments to said pulse-width modulation or a pulse of predetermined length so often in time, that adjustment by said integer multiple or said pulse accords, averaged over time, with a pulse-width modulation adjustment with said desired pulse-width adjustment increment.

3. The method according to claim 2, further comprising the steps of:

generating by said monitoring an analog monitoring signal;

analog to digital converting said analog monitoring signal to generate a digital monitoring signal; and performing said analog to digital converting at least twice in parallel.

4. The method according to claim 1, further comprising the steps of performing each of said analog to digital convertings with oversampling.

5. The method according to claim 1, wherein said analog to digital convertings are performed at a respective equal sampling rate.

6. The method according to claim 5, wherein said analog to digital convertings are performed at a constant sampling rate.

7. The method according to claim 1, wherein said analog to digital convertings are performed synchronously.

8. The method according to claim 1, wherein each of said analog to digital convertings are performed with a sampling rate of at least 100 kHz.

9. The method according to claim 2, further comprising the steps of selecting said predetermined length equal to said predetermined minimum pulse-width adjustment increment.

10. The method according to claim 2, further comprising the steps of applying said pulse of predetermined length as a pulse-frequency modulation with only a variable pulse repetition frequency.

11. The method according to claim 10, further comprising the steps of modulating pulse repetition period of said pulse-frequency modulation by an integer multiple of said pulse repetition period of said pulse-width modulation.

12. The method according to claim 2, further comprising the steps of adjusting pulse-width of said pulse-width modulation by an integer multiple of said predetermined minimum pulse-width adjustment increment, integrating the resulting control deviation in time or adding the resulting control deviation in subsequent pulse-repetition periods, and applying said single pulse of predetermined length, whenever the result of said integrating or of said adding accords with a control deviation which necessitates adjusting said pulse-width by a predetermined minimum pulse-width adjustment increment.

13. The method according to claim 1, characterized by controlling electrical power of at least 100 VA.

14. The method according to claim 1, further comprising the steps of monitoring said electrical power by monitoring current or voltage delivered to said load.

15. A negative feedback-controlled power supply comprising:

a monitoring unit monitoring electing power delivered to a load and having an analog monitoring signal output, an analog to digital converter unit having an analog signal input being operationally connected to said analog monitoring signal output and having a digital monitoring signal output, a controller unit with a digital signal input operationally connected to said digital monitoring signal output and further having a control output, further comprising a difference forming unit, a first input thereof being operationally connected to said digital monitoring signal input, a second input thereof being operationally connected to an output of a rated value signal source and further having a difference signal output operationally connected to said control output, a power adjusting unit with a power input, a power output and a control input, said power output being operationally connected to an input of said monitoring unit and being operationally connectable to said load, the control input being operationally connected to said control output, wherein said analog to digital converter unit comprises at least two analog to digital converters, the analog inputs thereof being operationally connected to said analog signal input and having a digital signal output each being operationally connected to said digital monitoring signal output, further comprising a sampling/converting control unit with at least two sampling/converting control outputs, said at least two sampling/converting control outputs being operationally connected respectively to a sample/converting control input of each of said at least two converters, said sampling/converting control unit generating at said at least two sampling/converting control outputs sample and conversion enabling signals.

16. A negative feedback-controlled power supply, comprising a monitoring unit monitoring electric power delivered to a load and having a monitoring signal output, a controller unit with a monitoring signal input operationally connected to said monitoring signal output and further having a control output, a difference forming unit, a first input thereof being operationally connected to said monitoring signal input, a second input thereof being operationally connected to an output of a rated value signal source, and further having a difference signal output, a pulse-width control unit with a pulse-width control input operationally connected to said difference signal output and having an output operationally connected to said control output and generating at said control output a pulse-width modulated control signal;

a power adjusting unit with a power input, a power output and a control input, said power output being operationally connected to an input of said monitoring unit and being operationally connectable to a load, the control input being operationally connected to said control output, said power adjusting unit further comprising a power-pulse-width modulation unit with a pulse-width control input operationally connected to said control input and with an input operationally connected with said power input and with an output operationally connected to said power output, said power-pulse-width modulation unit transmitting a signal applied to said power input, pulse-width modulated to said power output with a predetermined minimum pulse-width adjustment increment, wherein said controller unit further comprises a calculation unit, one calculation input thereof being operationally connected to said difference signal output, the calculation output thereof being operationally connected to said pulse-width control input and calculating in dependency of a signal applied to said calculation input a desired pulse-width adjustment increment at said pulse-width modulation unit, said calculation unit generating at said calculation output a first control signal controlling adjustment of pulse-width of said pulse-width control unit by an integer number of said predetermined minimum pulse-width adjustment increment according to an integer of the ratio of said desired pulse-width adjustment increment and said predetermined minimum pulse-width adjustment increment, and generating at said calculation output a second control signal controlling frequency of a frequency modulated pulse train with a pulse of predetermined pulse-width according to a fraction of the ratio of said desired pulse-width adjustment increment and said predetermined minimum pulse-width adjustment increment.

17. The negative feedback control power supply according to claim 16, characterized by the fact that said monitoring signal output is an analog monitoring signal output and said monitoring signal input is a digital monitoring signal input and further comprising an analog to digital converter unit interconnected between said analog monitoring signal output and said digital monitoring signal input and comprising at least two analog to digital converters, the analog inputs thereof being operationally connected to said analog monitoring signal output and having a digital signal output each being operationally connected to said digital monitoring signal output and further comprising a sampling/conversion control unit with at least two sampling/converting control outputs, said at least two sampling/converting control outputs being operationally connected respectively to a sample/converting control input at each of said at least two converters, said sampling/conversion control unit generating at said at least two sampling/converting control outputs sample and convert enabling signals.

18. The power supply according to claim 15, wherein said power adjusting unit adjusting a power delivered to said load of at least 100 VA.

19. The power supply according to claim 15, wherein a power at said power output is controlled with a resolution of at least 10 ppm, preferably with a resolution of at least 1 ppm.

20. The power supply according to claim 15, further comprising a synchrotron system with electron beam-controlling magnets, said magnets being electrically supplied by said power supplies.

21. A method for negative feedback controlling electrical power delivered to an electrical load comprising:

monitoring electrical power delivered to said load, thereby generating a monitoring signal;

forming in dependency of said monitoring signal and of a rated value signal a control deviation signal;

adjusting said electrical power delivered and monitored in function of said control deviation signal by means of pulse-width modulation with a predetermined pulse repetition period;

said pulse-width modulation being adjustable with a predetermined minimum pulse-width adjustment increment; and wherein by calculating from said control deviation signal a desired pulse-width adjustment increment and applying an integer multiple of said predetermined minimum pulse-width adjustment increments to said pulse-width modulation and a pulse of predetermined length so often in time, that adjustment by said integer multiple and said pulse accords, averaged over time, with a pulse-width modulation adjustment with said desired pulse-width adjustment increment.

22. The method according to claim 21, further comprising the steps of:

generating by said monitoring an analog monitoring signal;

analog to digital converting said analog monitoring signal to generate a digital monitoring signal; and performing said analog to digital converting at least twice in parallel.

23. The method according to claim 22, further comprising the steps of performing each of said analog to digital converting with oversampling.

24. The method according to claim 22, wherein said analog to digital convertings are performed at a respective equal sampling rate.

25. The method according to claim 24, wherein said analog to digital convertings are performed at a constant sampling rate.

26. The method according to claim 22, wherein said analog to digital convertings are performed synchronously.

27. The method according to claim 22, wherein each of said analog to digital convertings are performed with a sampling rate of at least 100 kHz.

28. The method according to claim 21, further comprising the steps of selecting said predetermined length equal to said predetermined minimum pulse-width adjustment increment.

29. The method according to claim 21, further comprising the steps of applying said pulse of predetermined length as a pulse-frequency modulation with only a variable pulse repetition frequency.

30. The method according to claim 22, further comprising the steps of modulating pulse repetition period of said pulse-frequency modulation by an integer multiple of said pulse repetition period of said pulse-width modulation.

31. The method according to claim 21, further comprising the steps of adjusting pulse-width of said pulse-width modulation by an integer multiple of said predetermined minimum pulse-width adjustment increment, integrating the resulting control deviation in time or adding the resulting control deviation in subsequent pulse-repetition periods, and applying said single pulse of predetermined length, whenever the result of said integrating or of said adding accords with a control deviation which necessitates adjusting said pulse-width by a predetermined minimum pulse-width adjustment increment.

32. The method according to claim 21, characterized by controlling electrical power of at least 100 VA.

33. The method according to claim 21, further comprising the steps of monitoring said electrical power by monitoring current or voltage delivered to said load.

* * * * *